United States Patent [19]

Saby

[11] 4,019,956

[45] Apr. 26, 1977

[54] PROCESS FOR RECOVERING HAIR BY DISSOLVING THE SKIN OR HIDE

[75] Inventor: Carnot E. A. R. Saby, Saint Quentin, France

[73] Assignee: Omnium de Prospective Industrielle, S.A., Neuville Saint Amand, France

[22] Filed: July 22, 1975

[21] Appl. No.: 598,028

[30] Foreign Application Priority Data

July 30, 1974 France .............................. 74.26342

[52] U.S. Cl. ...................................... 195/6; 8/94.14

[51] Int. Cl.[2] ........................................... C12B 1/00

[58] Field of Search ......... 195/6, 5; 8/94.14, 94.16, 8/94.18

[56] References Cited

UNITED STATES PATENTS

| | | | |
|---|---|---|---|
| 2,363,646 | 11/1944 | Conquest et al. ...................... | 195/6 |
| 3,076,749 | 2/1963 | Grimm .................................. | 195/6 |

OTHER PUBLICATIONS

Gustavson, "The Chemistry and Reactivity of Collagen," Academic Press Publishing Co., 1956, pp. 277–278.
Alexander et al., "Wool Its Chemistry and Physics," Reinhold Publishing Corp., 1954, pp. 265–269.
Hackh's, "Chemical Dictionary," McGraw Hill Book Co., 1970, p. 498.

*Primary Examiner*—R. B. Penland
*Attorney, Agent, or Firm*—Eslinger Lewis H.

[57] ABSTRACT

The invention relates to a process permitting the dissolving of the skin or hide and the recovery of the hair. After rehydrating and scouring the skins or hides are plumped and predegraded at an alkaline pH and then dissolved by enzymatic action. The hair obtained is in a satisfactory condition and can be subsequently utilized.

11 Claims, No Drawings

PROCESS FOR RECOVERING HAIR BY DISSOLVING THE SKIN OR HIDE

The present invention relates to an enzymatic process aimed at eliminating the skin or hide and permitting the recovery of the hair in a satisfactory condition enabling it to be used subsequently.

In the production of leather conventionally skins and hides are treated with lime and sulphides, whereby the hair is generally destroyed. Enzymatic depilation processes are also known permitting the at least partial preservation of the hair. However most of these processes have been developed with the aim of obtaining depilated skins which are suitable for tanning and which give top quality leather. The hair is always at least partly destroyed making its subsequent use impossible.

Depending upon the type of skin or hide and possibly the economic conditions it can be more important to recover the hair in good condition, even if this necessitates the destruction of the skin or hide. This is in fact the object of the present invention which proposes to dissolve the skin or hide by using a process which does not attack the hair.

It is already known that enzymes have an action on the skin and permit the detachment of hair. Therefore the present invention proposes an enzymatic treatment process whose application conditions permit a much more complete action on the skin or hide, causing it to finally be dissolved. To this end, after rehydration and scouring the skin or hide is treated at a pH at least equal to 8 in a bath containing sodium perborate and urea. A bacterial protease is then added to this bath which dissolves the previously plumped and predigested skin or hide. The bath must contain about 2% of sodium perborate, 1 to 10% and preferably about 5% of urea and 0.5 to 5% and preferably about 2% of bacterial protease per kg of dry skin or hide. Preferably the bath is left to act for at least 4 hours before adding the bacterial protease.

The presence of a wetting agent in the bath is also advantageous.

Preferably at least one alkaline-earth or alkali metal halide is added to the bath in a proportion of 1 to 10% and preferably of the order of 5%. The most effective salts are sodium chloride and calcium chloride.

The enzymatic treatment according to the present invention can be applied to tanned or untanned, green or dry skins or hides. However, the use of green hides or skins considerably decreases the treatment period.

The treatment is performed in several stages. According to the conventional method using dry skins or hides the latter are firstly rehydrated in a water bath which preferably contains a wetting agent. This operation is generally performed at ambient temperature and takes 2 to 5 hours depending on the condition of the skin to be treated. Washing removes impurities.

Scouring is then carried out by the action of sodium carbonate dissolved in water. The bath temperature is maintained at about 30° to 35° C. The bath volume must be about 10 liters per kg of treated skin and must contain 3g of sodium carbonate per liter so as to extensively cover the skin which itself occupies a large volume. However the bath volume can be decreased if this is made necessary by equipment requirements. The sodium carbonate content is then determined as a function of the weight of skin or hide introduced. The addition of a wetting agent accelerates scouring. The skin or hide is then copiously rinsed.

The skin dissolving treatment is performed in two stages, namely a preliminary treatment for plumping and pre-degrading the skin or hide followed by the actual enzymatic treatment itself.

The preliminary treatment is performed by maintaining the skin or hide in water at a pH above 8 and a temperature of about 60° C for 4 to 5 hours, depending on the type of skin.

It is necessary to add certain salts which serve to maintain the alkaline pH and aid the initial protein degradation. Sodium perborate increases the plumping of the skin or hide, whose cohesion is due to hydrogen interactions. The most effective proportion is about 2% per kg of dried skin or hide. The introduction of 1 to 10% and preferably about 5% of urea further increases the phenomenon, whilst starting off the denaturing of the proteins leading to a more disordered state than in the case of proteins which have not been denatured. This disordered state would appear to be due to the breaking of intramolecular hydrogen bonds and therefore causes a significant loss of homogeneity and strength of the skins or hides involved.

To further improve plumping it is possible to add salts such as alkaline-earth or alkali metal halides, such as potassium, calcium, barium and sodium chlorides, bromides and iodides. The cheapest and most effective are sodium chloride and calcium chloride. They must be added in a proportion of 1 to 10% and preferably approximately 5% per kg of dried skin or hide.

The addition of a wetting agent also aids plumping.

The pH of the solution obtained after adding the above-indicated ingredients is about 10 and during plumping drops to about 8. The alkaline pH tends to increase plumping of the skin or hide and also aids enzymatic action in the following stage. Moreover, at the low temperature used this pH, although alkaline does not influence the appearance of the hair obtained at the end of treatment. The salts used also ensure an intial bleaching of the treated hair.

Enzymatic treatment is then performed by bacterial proteases associated with an antiseptic agent which serves to prevent undesirable microbial developments. A temperature of about 50° C ensures the most favourable kinetics. No washing process is performed between the preliminary treatment and the enzymatic treatment, which prolongs the action of the reagents used in the preliminary treatment either by action on the skin or hide or by activating the enzyme. Thus the pH is maintained at about 8. The enzyme quantity used is between about 0.5 and 5% and preferably about 2% relative to the weight of the dry skin or hide. The enzyme is generally used in powder form and is then simply added to the preliminary treatment bath.

The skin or hide then dissociates and gradually dissolves. Periodic mechanical agitation aids homogenisation of the bath temperature and enzyme distribution. It also facilitates the separation of scraps from the skins and accelerates their digestion, whilst separating the hair. This agitation must not, however, be too violent with the object of preventing felting of the hair.

Digestion is completed after 15 to 20 hours. It is more rapid if a richer enzyme or a stronger concentration is used, but the duration also substantially depends on the quality and thickness of the skin or hide.

When digestion is at an end the hair is washed and brought to a slightly acid pH by the action of slightly acidified water. Any remaining waste material is removed by washing and the hair is recovered at the surface.

If the hair still has too high a fat content a further sodium carbonate scouring process can be performed.

The following example illustrates the invention.

25 kg of rabbit skin are treated.

1. Rehydration
   200 liters of water
   0.25 liters of wetting agent
   temperature: 20° C
   duration: 4 hours.
2. Washing
3. Scouring
   250 liters of water
   750 g of sodium carbonate
   0.25 liters of wetting agent
   Temperature: 30° C.
4. Washing
5. Preliminary treatment
   75 liters of water
   500 g of sodium perborate
   1.25 kg of sodium chloride
   1 kg of urea
   0.25 liters of wetting agent
   Temperature: 60° C
   duration: 4 hours.
   The pH which is initially 9.5 decreases to about 8.
6. Enzymatic treatment
   400 g of bacterial protease of bacillus subtilis are added to the preliminary treatment bath.
   The bath temperature is maintained at 50° C and mechanical agitation is performed periodically.
   After 20 hours the skin is completely dissolved.
7. Washing
   Optional reacidification.

The hair is recovered at the surface of the washing bath and undissolved waste material such as cartilages drop to the bottom of the bath. The quality of the hair obtained is equivalent to that of hair obtained by shaving skins. The hairs are longer and they can easily be spun and used for making fibers, fabrics, etc.

What is claimed is:

1. In a process for recovery of hair by dissolving the epidermal layers of animal skins or hides in a solution of bacterial protease, wherein said skins or hides are first rehydrated in water and thereafter scoured in an aqueous solution, the improvement comprising: (a) predigesting and plumping the rehydrated and scoured skins in a bath containing an effective amount of sodium perborate and 1 to 10% by weight urea based upon the weight of dried skins or hides at a pH of 8 to 10 for sufficient time to predigest and plump said rehydrated and scoured skins; (b) adding 0.5 to 5% by weight of a bacterial protease based upon said weight of dried skins or hides to said bath to complete the digestion of the epidermal layer and to separate hair therefrom; and (c) recovering the separated hair.

2. A process according to claim 1, wherein the bath contains about 5% of urea per kg of dried skin or hide.

3. A process according to claim 1, wherein about 2% of bacterial protease per kg of dried skin is added.

4. A process according to claim 1, wherein bacterial protease is added after the bath has reacted for at least 4 hours.

5. A process according to claim 1, wherein the bath contains a wetting agent.

6. A process according to claim 1, wherein the bath contains at least one alkali metal halide.

7. A process according to claim 6, wherein the bath contains between about 1 and 10% of alkali metal halide.

8. A process according to claim 6, wherein the alkali metal halide is sodium chloride.

9. A process according to claim 1, wherein the bath contains at least one alkaline-earth metal halide.

10. A process according to claim 9, wherein the bath contains between 1 and 10% of alkaline-earth metal halide.

11. A process according to claim 9, wherein the alkaline-earth metal halide is calcium chloride.

* * * * *